United States Patent
Zhu

(10) Patent No.: US 7,542,782 B2
(45) Date of Patent: Jun. 2, 2009

(54) METHOD AND APPARATUS FOR WIRELESS TRANSMISSION OF AUDIO SIGNALS OF COMPUTER

(75) Inventor: Yu-Shan Zhu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 285 days.

(21) Appl. No.: 11/309,550

(22) Filed: Aug. 18, 2006

(65) Prior Publication Data
US 2007/0206818 A1 Sep. 6, 2007

(30) Foreign Application Priority Data
Mar. 2, 2006 (CN) .................. 2006 2 20055920

(51) Int. Cl.
*H04M 1/00* (2006.01)
*H04B 7/00* (2006.01)

(52) U.S. Cl. .................. 455/556.1; 455/41.2; 455/557; 455/205

(58) Field of Classification Search ............. 455/556.1, 455/557, 41.3, 41.2, 180.3, 91, 126, 205
See application file for complete search history.

(56) References Cited
U.S. PATENT DOCUMENTS

| | | | |
|---|---|---|---|
| 5,799,042 A | 8/1998 | Xiao | |
| 6,138,050 A | 10/2000 | Schneider et al. | |
| 6,643,503 B1 | 11/2003 | Phillips | |
| 6,662,002 B2 * | 12/2003 | Kubo et al. | 455/323 |
| 6,788,743 B1 * | 9/2004 | Pfeil | 375/271 |
| 6,799,056 B2 * | 9/2004 | Curley et al. | 455/556.1 |
| 2006/0290437 A1 * | 12/2006 | Kimura | 332/127 |
| 2007/0213083 A1 * | 9/2007 | Shaanan | 455/500 |
| 2008/0137880 A1 * | 6/2008 | Mills et al. | 381/79 |

* cited by examiner

*Primary Examiner*—Sonny Trinh
(74) *Attorney, Agent, or Firm*—Wei Te Chung

(57) ABSTRACT

An RF transmitting apparatus is used for converting audio signals output from a sound card of a computer to RF signals and transmitting the RF signals. The RF transmitting apparatus comprises an interface, a modulating module, an amplifying module, a transmitting module, and an antenna. The interface is coupled to the sound card for receiving the audio signals, and rearranging the audio signals to be data packages. The modulating module is coupled to the interface for generating a carrier wave and receiving the data packages, and modulating the carrier wave with the data packages to generate modulated signals. The amplifying module is coupled to the modulating module for amplifying the modulated signals. The transmitting module is coupled to the amplifying module for converting the modulated signals to the RF signals. The antenna is coupled to the transmitting module for transmitting the RF signals.

10 Claims, 8 Drawing Sheets

METHOD AND APPARATUS FOR WIRELESS TRANSMISSION OF AUDIO SIGNALS OF COMPUTER

FIELD OF THE INVENTION

The present invention generally relates to wireless transmitting methods and wireless transmitting apparatuses, and more particularly to a method and an apparatus for wireless transmission of audio signals of a computer.

DESCRIPTION OF RELATED ART

Nowadays, lots of computer peripheral devices such as keyboards, mouse devices, printers, speakers are used to serve as input and/or output devices of computers. Generally, the peripheral devices are coupled to the computers via wires, through which information is transmitted between the computers and the peripheral devices.

Referring to FIG. 8, a traditional connecting method is used to connect a speaker 4 to a computer 2 via a wire 3. However, the connecting method has some disadvantages. If the wire 3 is not long enough, a changeless length of the wire 3 restricts the speaker 4 from being placed as desired. If the wire 3 is long, then the wire 3 may be prone to tangling and possibly be a tripping hazard for users.

A wireless connecting method is proposed to connect the peripheral devices to the computers. A typical infrared method uses infrared transmitters in the computers, and infrared receivers in the peripheral devices to establish infrared links between the peripheral devices and the computers. However, a clear line-of-sight between an infrared transmitter and an infrared receiver is required, otherwise the infrared signals are blocked.

Therefore, a wireless transmitting method and a wireless transmitting apparatus for a computer are needed in the industry to address the aforementioned deficiencies and inadequacies.

SUMMARY OF THE INVENTION

An RF transmitting apparatus is used for converting audio signals output from a sound card of a computer to RF signals and transmitting the RF signals. The RF transmitting apparatus comprises an interface, a modulating module, an amplifying module, a transmitting module, and an antenna. The interface is coupled to the sound card for receiving the audio signals, and rearranging the audio signals to be data packages. The modulating module is coupled to the interface for generating a carrier wave and receiving the data packages, and modulating the carrier wave with the data packages to generate modulated signals. The amplifying module is coupled to the modulating module for amplifying the modulated signals. The transmitting module is coupled to the amplifying module for converting the modulated signals to the RF signals. The antenna is coupled to the transmitting module for transmitting the RF signals.

Other systems, methods, features, and advantages of the present RF transmitting apparatus and method will be or become apparent to one with skill in the art upon examination of the following drawings and detailed description. It is intended that all such additional systems, methods, features, and advantages be included within this description, be within the scope of the present device, and be protected by the accompanying claims.

BRIEF DESCRIPTION OF THE DRAWINGS

Many aspects of the present radio frequency (RF) transmitting method and the present RF apparatus can be better understood with reference to the following drawings. The components in the drawings are not necessarily to scale, emphasis instead being placed upon clearly illustrating the principles of the present device. Moreover, in the drawings, like reference numerals designate corresponding parts throughout the several views.

DETAILED DESCRIPTION OF THE INVENTION

Reference will now be made to the drawings to describe preferred embodiments of the present radio frequency (RF) transmitting apparatus and a preferred embodiment of the present RF transmitting method.

Because RF signals can be propagated via the air in any directions and can move around barriers, signals such as television signals and radios are transmitted under an RF technology. The following embodiments employ the RF technology to connect a peripheral device to a computer. Preferably, the RF technology is a blue tooth technology using a frequency band ranging from 2.402 GHz to 2.480 GHz, and the peripheral device is a speaker.

Figure 1:
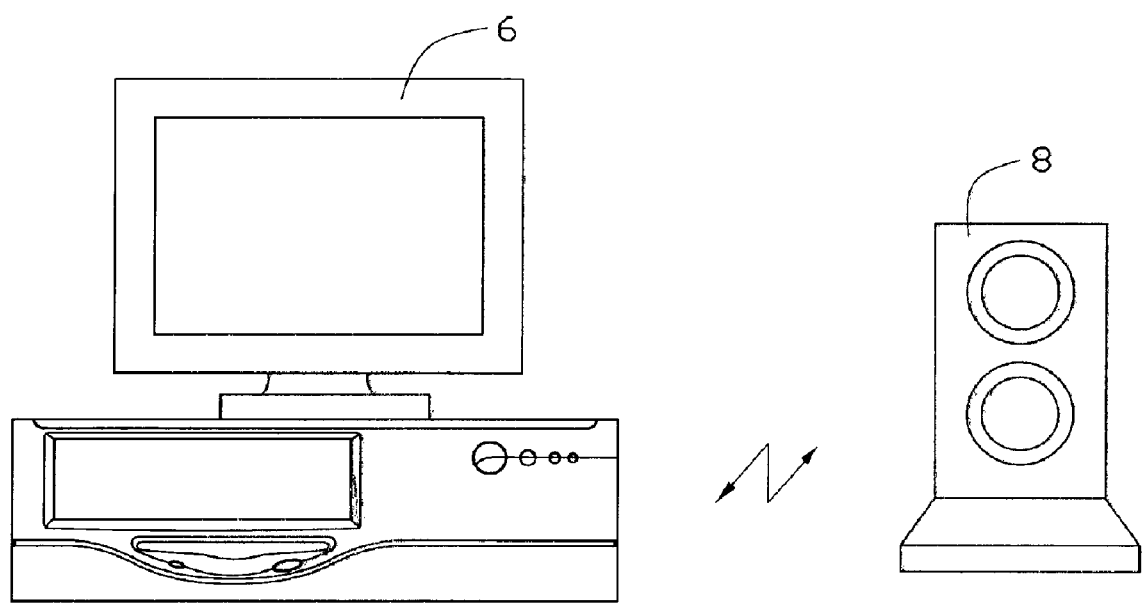
FIG. 1 is a schematic diagram illustrating an RF communicating relationship between a computer and a speaker in accordance with a first exemplary embodiment.

Referring to FIG. 1, a speaker 8 is coupled to a computer 6 via an RF link in accordance with a first embodiment. The computer 6 converts audio signals to RF signals, and then transmits the RF signals to the speaker 8 via an RF link. The speaker 8 includes a receiver (not shown) for receiving the RF signals, and converting the RF signals back to the audio signals to be reproduced for users.

Figure 2:
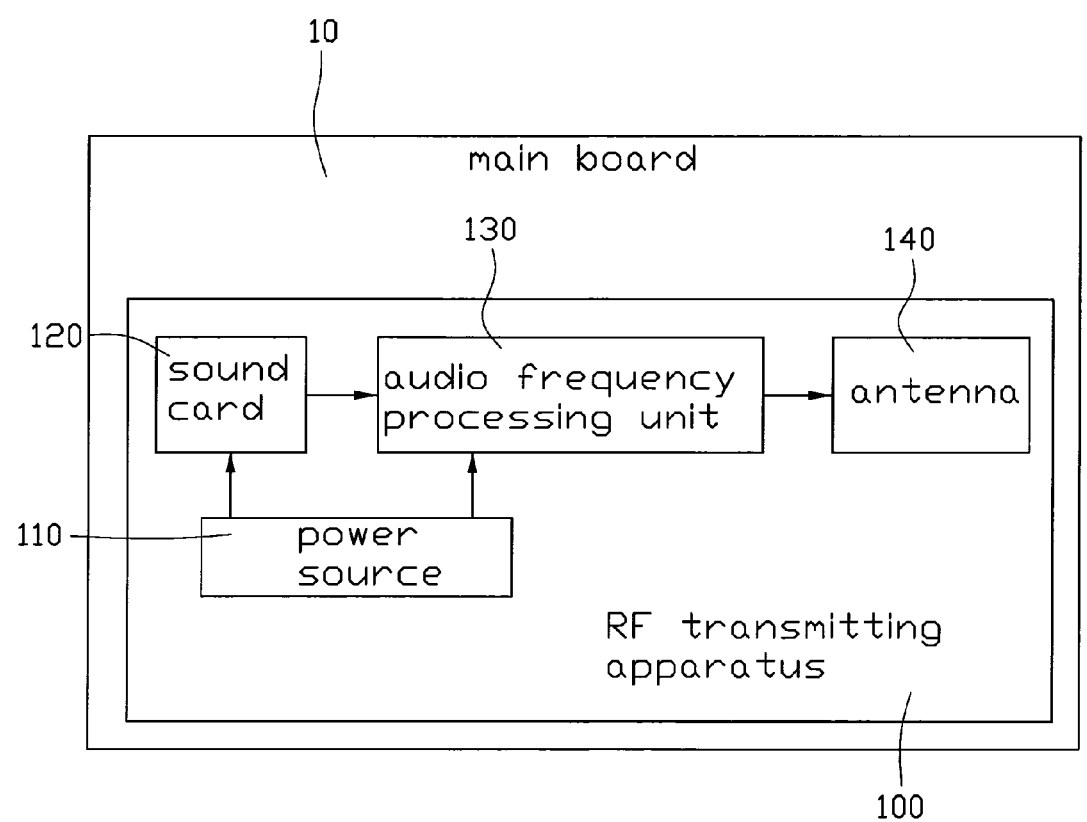
FIG. 2 is a block diagram illustrating an RF transmitting apparatus of FIG. 1, the RF transmitting apparatus including an audio frequency processing unit.

Referring to FIG. 2, the computer 6 includes an RF transmitting apparatus 100 integrated in a mainboard 10 thereof for generating and transmitting the RF signals. The RF transmitting apparatus 100 includes a power source 110, a sound card 120, an audio frequency processing unit 130, and an antenna 140. The power source 110 is operably coupled to supply power to the sound card 120 and the audio frequency processing unit 130. Exemplarily, the power source 110 supplies a voltage of 3.3 volts. The sound card 120 is operably coupled to output the audio signals to the audio frequency processing unit 130. The audio frequency processing unit 130 is used for receiving the audio signals, and converting the audio signals to the RF signals to be sent to the antenna 140. The antenna 140 is operably coupled to the audio frequency processing unit 130 for wirelessly transmitting the RF signals.

Figure 3:
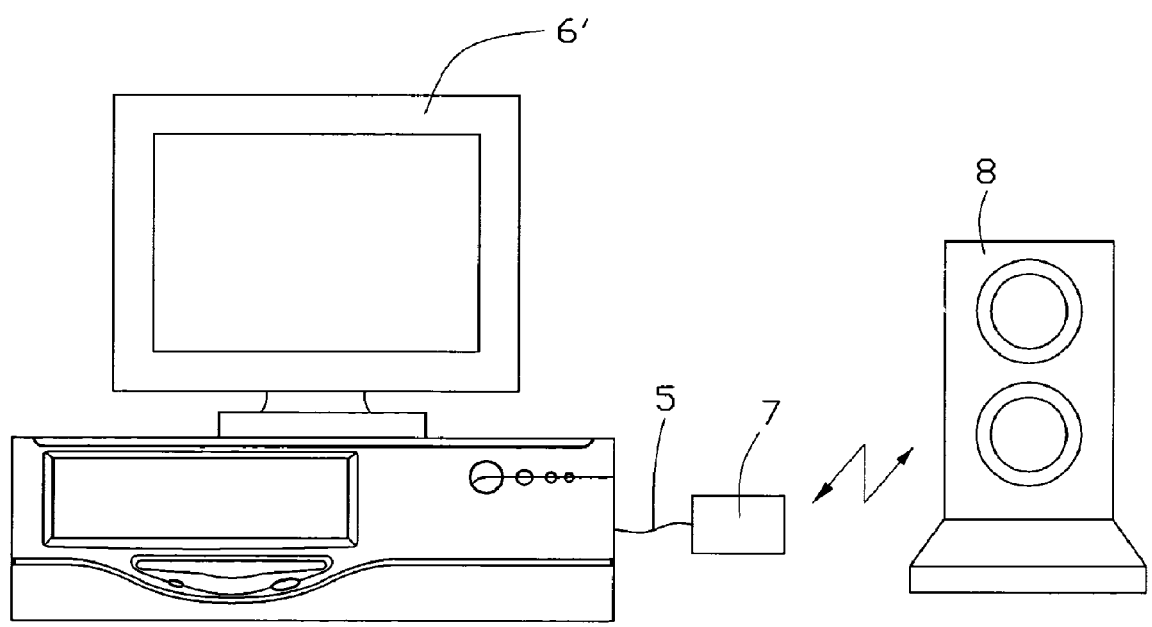
FIG. 3 is a schematic diagram illustrating an RF communicating relationship between a computer and a speaker in accordance with a second exemplary embodiment.

Referring to FIG. 3, a computer 6' communicates with the speaker 8 via an RF link in accordance with a second embodiment. An RF transmitting apparatus 7 is removably coupled to the computer 6' via a wire 5 for receiving audio signals from the computer 6', converting the audio signals to RF signals and transmitting the RF signals to the speaker 8 via the RF link. In comparison with the first embodiment, the RF transmitting apparatus 7 is independent from the computer 6' and can be removed from the computer conveniently.

Figure 4:
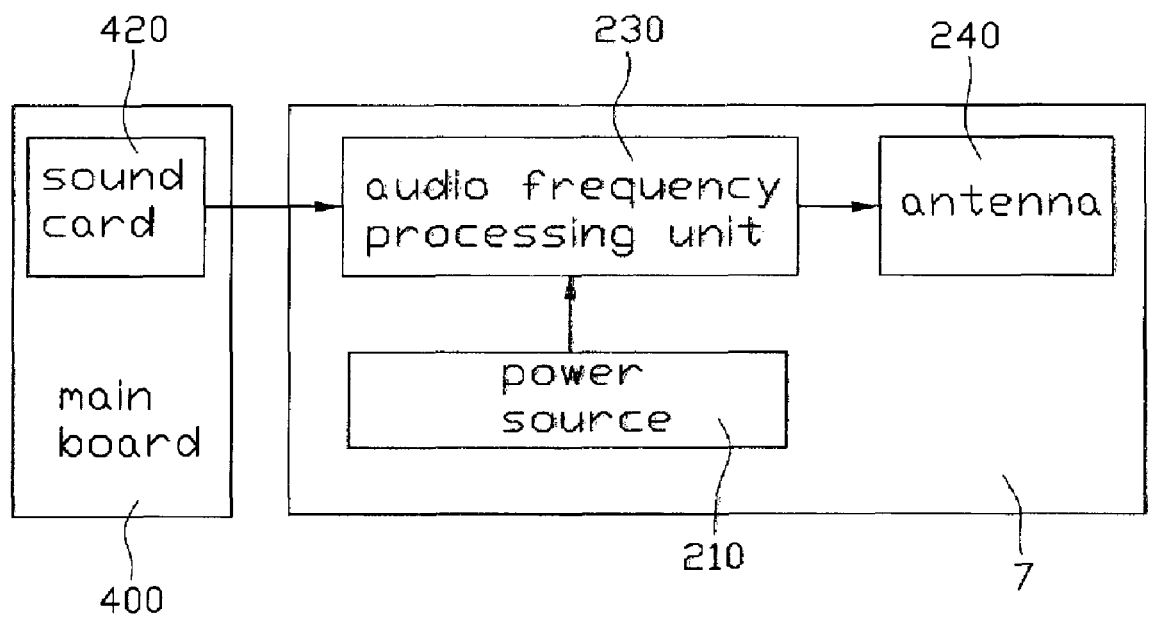
FIG. 4 is a block diagram illustrating an RF transmitting apparatus of FIG. 3, the RF transmitting apparatus including an audio frequency processing unit.

Referring to FIG. 4, the computer 6' includes a main board 400 for supporting a sound card 420 thereon. The sound card 420 is used for outputting the audio signals to be sent to the RF transmitting apparatus 7. The RF transmitting apparatus 7 includes a power source 210, an audio frequency processing unit 230, and an antenna 240. The power source 210 is operably coupled to supply power to the audio frequency processing unit 230. Exemplarily, the power source 210 supplies a voltage of 3.3 volts. The audio frequency processing unit 230 is used for receiving the audio signals, and converting the audio signals to the RF signals to be sent to the antenna 240. The antenna 240 is operably coupled to the audio frequency processing unit 230 for wirelessly transmitting the RF signals.

Figure 5:
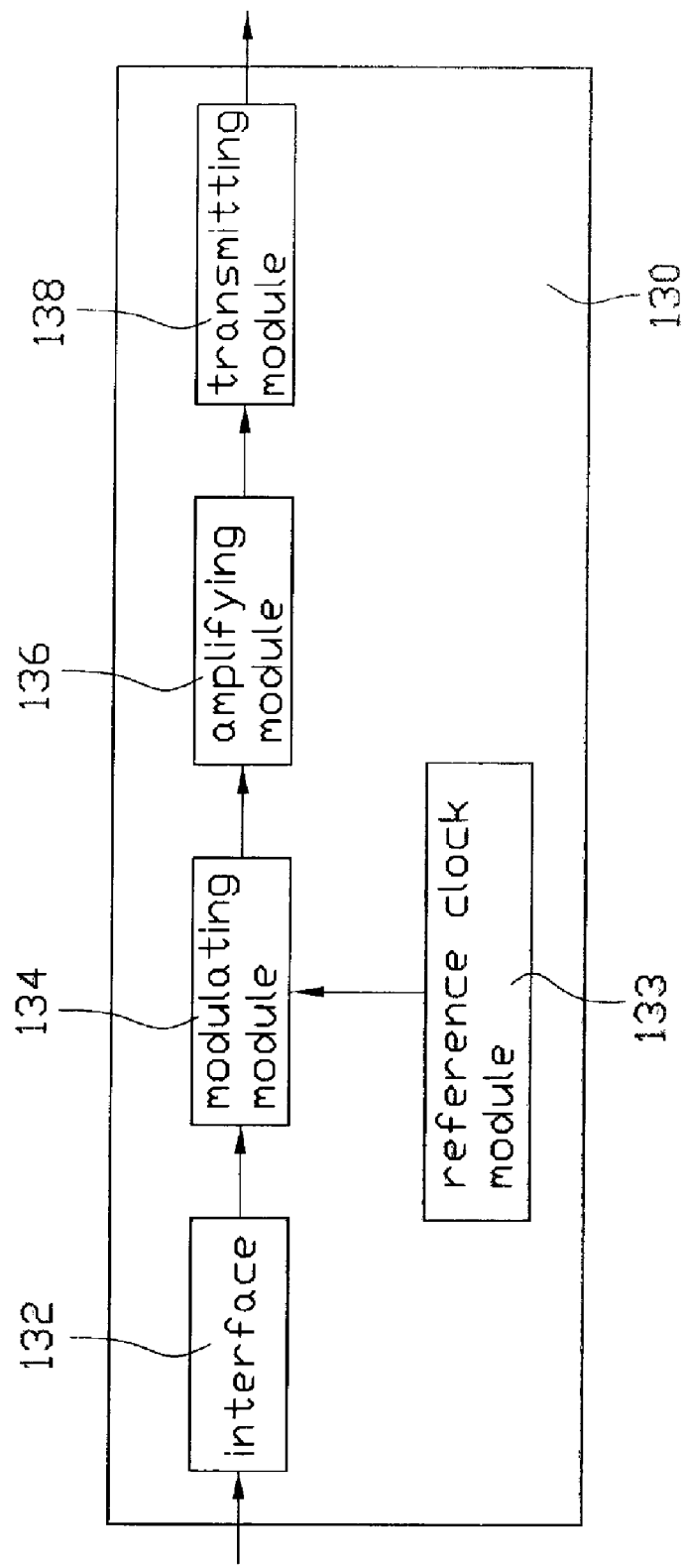
FIG. 5 is a block diagram illustrating the audio frequency processing unit of FIG. 2 and FIG. 4, the audio frequency processing unit including a modulating module.

Because the audio frequency processing unit 130 of the first embodiment is the same as the audio frequency processing unit 230 of the second embodiment, the audio frequency processing unit 130 is used as an example for ease of description. Also referring to FIG. 5, the audio frequency processing unit 130 includes an interface 132, a reference clock module 133, a modulating module 134, an amplifying module 136, and a transmitting module 138. The interface 132, the modulating module 134, the amplifying module 136, and the transmitting module 138 are coupled in series. The interface 132 is also coupled to the sound card 420. The reference clock module 133 is coupled to the modulating module 134. The transmitting module 138 is coupled to the antenna 140.

The interface 132 receives the audio signals, and rearranges the audio signals to form data packages in series and sends the data packages to the modulating module 134. The reference clock module 133 generates reference clock signals having a constant frequency to send to the modulating module 134. Exemplarily, the constant frequency is 2.4 GHz. The modulating module 134 receives the data packages and the reference clock signal, and generates a carrier wave. The modulating module 134 adjusts a frequency of the carrier wave based on the reference clock signals, and then modulates the carrier wave with the data packages to generate modulated signals. The modulated signals are sent to the amplifying module 136. The amplifying module 136 amplifies the modulated signals, and then sends the modulated signals to the transmitting module 138. The transmitting module 138 converts the modulated signals to the RF signals, and sends the RF signals to the antenna 240.

Figure 6:
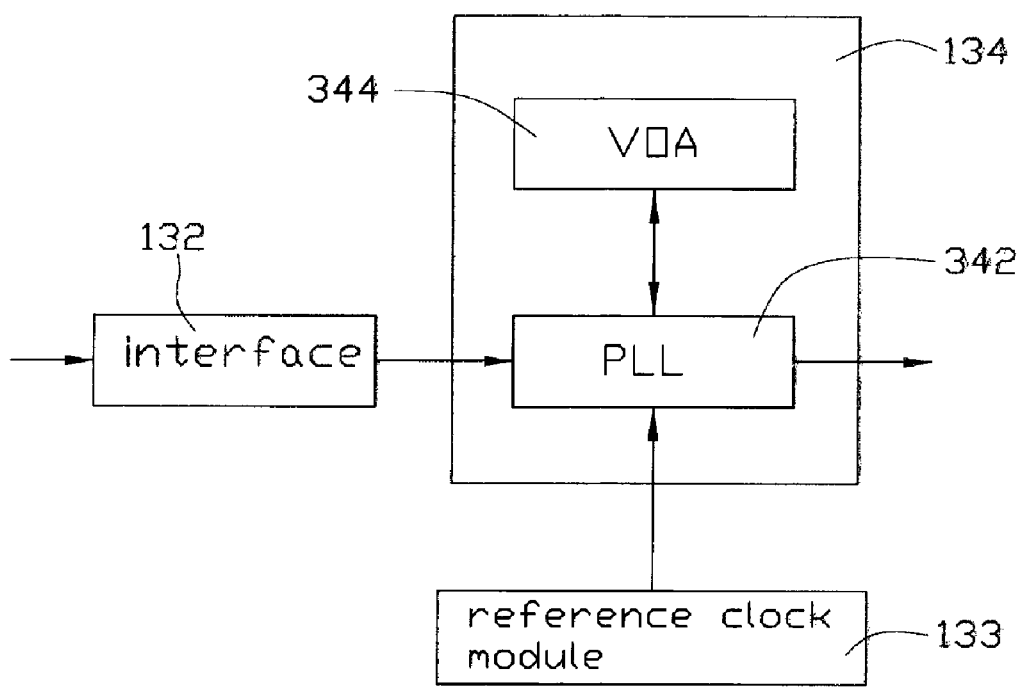
FIG. 6 is a block diagram illustrating the modulating module of FIG. 5.

Also referring to FIG. 6, the modulating module 134 includes a phase-locked loop (PLL) 342, and a voltage controlled oscillator (VOA) 344. The VOA 344 generates the carrier wave to send to the PLL 342. The PLL 342 receives the reference clock signals and the carrier wave, and then compares the frequency of the carrier wave with the constant frequency of the reference clock signals. The comparison result is fed back to the VOA 344. The VOA 344 adjusts the frequency of the carrier wave based on the comparison result. Meanwhile, the PLL 342 receives the data packages from the interface 132, and modulates the carrier wave with the data packages to generate the modulated signals.

Figure 7:
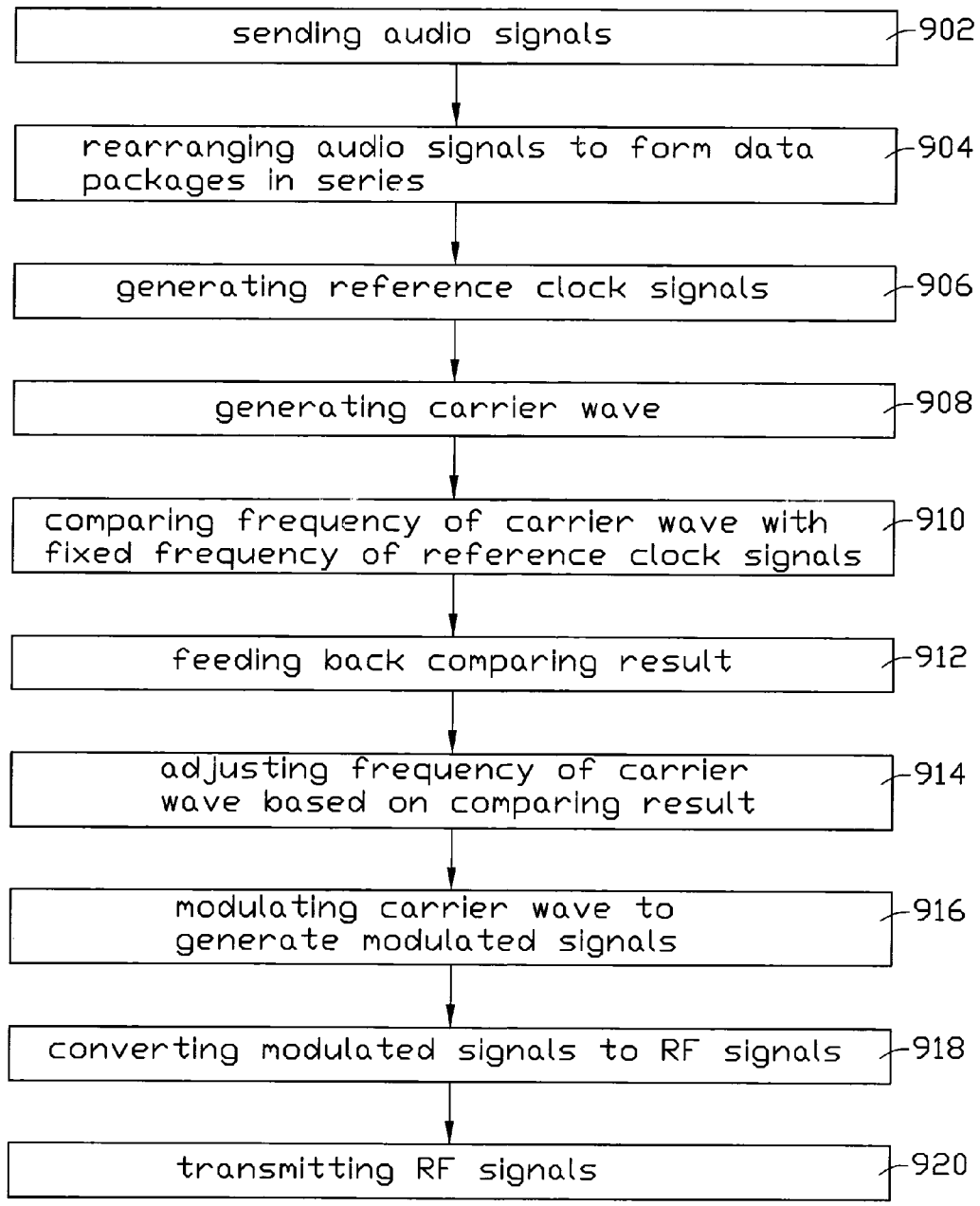
FIG. 7 is a process flow diagram illustrating an RF transmitting method in accordance with an exemplary embodiment.
Figure 8:
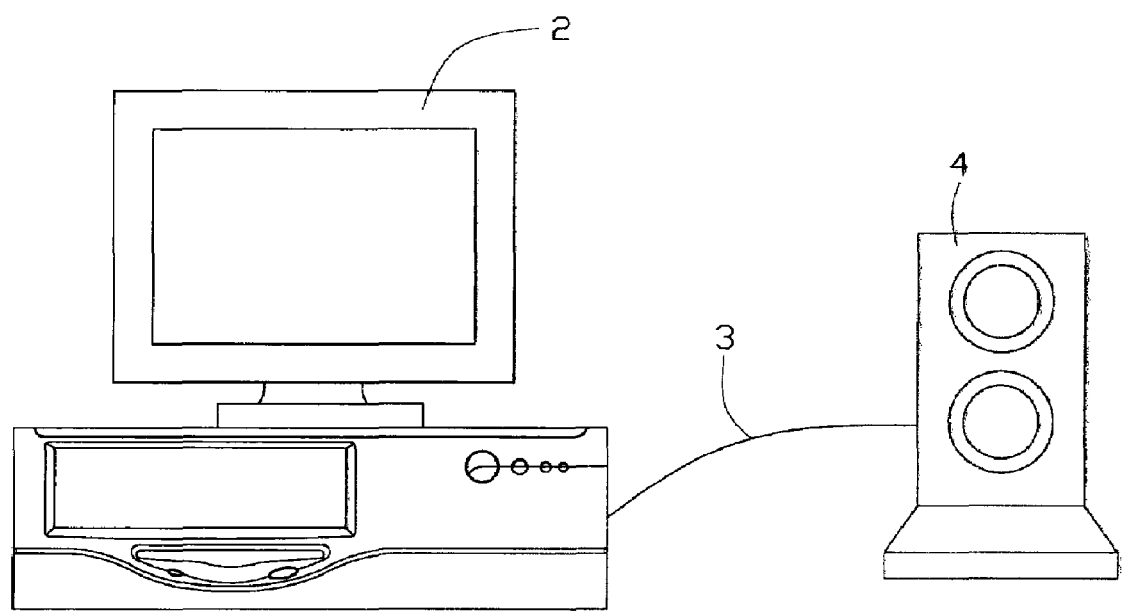
FIG. 8 is a schematic diagram illustrating a conventional connecting relationship between a computer and a speaker.

Referring to FIG. 7, a RF transmitting method is used for transmitting audio signals of the computer 6 to the speaker 8. A procedure of the RF transmitting method includes following steps.

The sound card 120 sends the audio signals to the interface 132 (step 902).

The interface 132 receives the audio signals, and rearranges the audio signals to form data packages in series and sends the data packages to the VOA 344 of the modulating module 134 (step 904).

The reference clock module 133 generates and sends reference clock signals having a constant frequency to the PLL 342 of the modulating module 134 (step 906).

The VOA 344 generates the carrier wave to send to the PLL 342 (step 908).

The PLL 342 receives the reference clock signals and the carrier wave, and then compares the frequency of the carrier wave with the constant frequency of the reference clock signals (step 910).

The comparison result is fed back to the VOA 344 (step 912).

The VOA 344 adjusts the frequency of the carrier wave based on the comparison result (step 914).

The PLL 342 receives the data packages from the interface 132, and modulates the carrier wave with the data packages to generate modulated signals (step 916).

The transmitting module 138 converts the modulated signals to the RF signals (step 918).

The antenna 240 transmits the RF signals to the speaker 8 (step 920).

It should be emphasized that the above-described preferred embodiments, are merely possible examples of implementation of the principles of the invention, and are merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and be protected by the following claims.

What is claimed is:

1. An RF transmitting apparatus for converting audio signals output from a sound card of a computer to RF signals and transmitting the RF signals, the RF transmitting apparatus comprising:

an interface coupled to the sound card for receiving the audio signals from the computer, and rearranging the audio signals to form data packages;

a reference clock module for sending reference clock signals;

a modulating module coupled to the interface and the reference clock module for receiving the data packages, the modulating module is capable of adjusting a frequency of a carrier wave with a constant frequency of the reference clock signals, and modulating the carrier wave with the data packages to generate modulated signals;

an amplifying module coupled to the modulating module for amplifying the modulated signals;

a transmitting module coupled to the amplifying module for converting the modulated signals to the RF signals; and an antenna coupled to the transmitting module for transmitting the RF signals.

2. The RF transmitting apparatus according to claim 1, wherein the constant frequency is 2.4 GHz.

3. The RF transmitting apparatus according to claim 2, wherein the modulating module comprises a phase-locked loop (PLL), coupled to the interface, the reference clock module, and the amplifying module, and the PLL is configured for generating a comparison result by comparing the frequency of the carrier wave with the constant frequency of the reference clock signals.

4. The RF transmitting apparatus according to claim 3, wherein the modulating module further comprises a voltage controlled oscillator (VOA) coupled to the PLL, and the VOA is operably coupled to generate the carrier wave, and adjust the frequency of the carrier wave based on the comparison result.

5. An RF transmitting method for converting audio signals of a computer to RF signals and transmitting the RF signals, the RF transmitting method comprising steps of:
   rearranging the audio signals to form data packages in series;
   generating a carrier wave;
   generating reference clock signals having a constant frequency;
   generating comparison result by comparing a frequency of the carrier wave with the constant frequency of the reference clock signals;
   feeding back the comparison result;
   adjusting the frequency of the carrier wave based on the comparison result;
   modulating the carrier wave with the data packages to generate modulated signals;
   converting the modulated signals to the RF signals; and
   transmitting the RF signals.

6. The RF transmitting method according to claim 5, wherein the constant frequency is 2.4 GHz.

7. The RF transmitting method according to claim 5, further comprising a step of amplifying the RF signals before the transmitting step.

8. A computer comprising:
   a circuit board with a sound card for sending audio signals;
   an audio frequency processing unit comprising an interface electrically coupled to the sound card for rearranging the audio signals to form data packages, a reference clock module for sending reference clock signals, a modulating module electrically coupled to the interface and the reference clock module for adjusting a frequency of a carrier wave with a constant frequency of the reference clock signals and modulating the carrier wave with data packages to generate modulated signals, an amplifying module electrically coupled to the modulating module for amplifying the modulated signals, and a transmitting module electrically coupled to the amplifying module for converting the modulate signals to RF signals;
   an antenna electrically coupled to transmitting module of the audio frequency processing unit for transmitting the RF signals; and
   a speaker for receiving the RF signals and converting the RF signals back to the audio signals.

9. The computer as claimed in claim 8, wherein the audio frequency processing unit and the antenna are arrayed on the circuit board within the computer.

10. The computer as claimed in claim 8, wherein the audio frequency processing unit and the antenna are arrayed outside of the computer and removably coupled to the computer via a wire.

* * * * *